(12) United States Patent
Rakaczki

(10) Patent No.: US 8,112,895 B2
(45) Date of Patent: Feb. 14, 2012

(54) POWER HACKSAW WITH A FASTENING DEVICE FOR A SAW BLADE

(75) Inventor: Janos Rakaczki, Miskolc (HU)

(73) Assignee: Robert Bosch GmbH, Stuttgart (DE)

( * ) Notice: Subject to any disclaimer, the term of this patent is extended or adjusted under 35 U.S.C. 154(b) by 691 days.

(21) Appl. No.: 12/095,576

(22) PCT Filed: Apr. 5, 2007

(86) PCT No.: PCT/EP2007/053353
§ 371 (c)(1),
(2), (4) Date: May 30, 2008

(87) PCT Pub. No.: WO2007/137900
PCT Pub. Date: Dec. 6, 2007

(65) Prior Publication Data
US 2010/0229407 A1 Sep. 16, 2010

(30) Foreign Application Priority Data

May 31, 2006 (DE) .......................... 10 2006 025 768

(51) Int. Cl.
*B23D 49/00* (2006.01)
(52) U.S. Cl. ....................................... 30/392; 83/699.21
(58) Field of Classification Search .................... 30/392, 30/277.4, 142; 83/699.21
See application file for complete search history.

(56) References Cited

U.S. PATENT DOCUMENTS

| 4,294,013 | A | * | 10/1981 | Krieg ................................. 30/392 |
| 4,550,500 | A | | 11/1985 | Kuhlmann et al. |
| 5,382,249 | A | * | 1/1995 | Fletcher ........................... 606/79 |
| 5,458,346 | A | * | 10/1995 | Briggs ................................ 279/97 |
| 5,473,820 | A | * | 12/1995 | Neubert et al. .................. 30/386 |
| 5,722,309 | A | * | 3/1998 | Seyerle ....................... 83/699.21 |
| 6,502,317 | B2 | * | 1/2003 | Dassoulas et al. ............... 30/392 |
| 6,810,782 | B2 | * | 11/2004 | Wuensch et al. ............ 83/699.21 |
| 6,848,186 | B1 | * | 2/2005 | Chen et al. ....................... 30/392 |
| 6,854,187 | B2 | * | 2/2005 | Huan ............................... 30/392 |
| 6,944,959 | B2 | * | 9/2005 | Bigden et al. .................... 30/392 |
| 7,003,888 | B2 | * | 2/2006 | Bigden et al. .................... 30/392 |
| 7,111,405 | B2 | * | 9/2006 | Delfini et al. .................... 30/392 |
| 7,325,315 | B2 | * | 2/2008 | Bigden et al. .................... 30/392 |
| 7,441,338 | B2 | | 10/2008 | Delfini et al. |
| 7,748,125 | B2 | * | 7/2010 | Rakaczki ......................... 30/392 |
| 7,774,944 | B1 | * | 8/2010 | Wagenbach .................... 30/392 |
| 7,833,241 | B2 | * | 11/2010 | Gant ............................... 606/176 |
| 2006/0042445 | A1 | | 3/2006 | Delfini et al. |

FOREIGN PATENT DOCUMENTS

| CN | 1743116 | 3/2006 |
| DE | 32 47 178 | 6/1984 |
| DE | 10 2004 042 026 | 3/2006 |

* cited by examiner

*Primary Examiner* — Boyer D Ashley
*Assistant Examiner* — Omar Flores Sanchez
(74) *Attorney, Agent, or Firm* — Michael J. Striker

(57) ABSTRACT

A reciprocating saw has a locking element (9) for axially fixing the saw blade (5) in a fastening device, wherein a release device (10) is provided, with which the locking element can be displaced into its release position against the spring force of an adjusting spring. A component (12), acting upon the locking element, of the release device is arranged, with respect to the plane of the saw blade, on the same side as the locking element.

9 Claims, 5 Drawing Sheets

POWER HACKSAW WITH A FASTENING DEVICE FOR A SAW BLADE

CROSS-REFERENCE TO RELATED APPLICATION

The invention described and claimed hereinbelow is also described in German Patent Application DE 10 2006 025 768.5 filed on May 31, 2006. This German Patent Application, whose subject matter is incorporated here by reference, provides the basis for a claim of priority of invention under 35 U.S.C. 119(a)-(d).

BACKGROUND OF THE INVENTION

The present invention relates to a reciprocating saw with a fastening device for a saw blade.

Publication DE 32 47 178 C2 describes a hand-guided jigsaw, the saw blade of which is detachably connected via a fastening device with a motor-driven lifting rod. The fastening device includes a rotary body, which is connected with the lifting rod, and a locking sleeve, which may be screwed onto the rotary body, and via which the jigsaw is retained on the lifting rod. To this end, the locking sleeve includes a passage on the end face into which the shank of the saw blade extends. In the fastening position, in which the locking sleeve is screwed into an outer thread of the rotary body, raised nubs on the shank of the saw blade are pressed into assigned recesses in the rotary body, thereby resulting in a form-fit lock.

The locking sleeve must be unscrewed from the rotary body in order to change the tool. It is possible that the locking sleeve may accidentally come loose automatically due to vibrations that occur during operation of the jigsaw.

SUMMARY OF THE INVENTION

The object of the present invention is to provide a reciprocating saw, the saw blade of which may be fixed securely in position and replaced quickly. The reciprocating saw should include a particularly small fastening device for fixing the saw blade in position on a movable lifting rod of the reciprocating saw.

According to a first aspect of the present invention, a locking element is provided for axially fixing the saw blade in position in the fastening device, which is acted upon by the force of an adjustment spring in the direction of the saw blade, and which may be displaced between a release position and a fixed position in which the saw blade is held in a form-fit manner. A release device is also provided, with which the locking element is displaceable against the force of the adjustment spring back into its release position, so that the saw blade may be removed from the fastening device and replaced. A component of this release device that acts on the locking element is located on the same side as the locking element, relative to the plane of the saw blade.

Given that the locking element and the component of the release device—which is acted upon—are located on the same side of the saw blade, a space-saving, compact device may be realized, in which the essential elements of the fastening device and the release device are located on the same side.

In a further inventive design, a release switch is assigned to the release device on the outside of the housing, the release device including a switching flange, which is connected with the release switch, and which is located inside the housing. This switching flange acts on the locking element. The contact point between the switching flange and the locking element is located at a distance away from the plane of motion of the release switch. With this design, a spacial offset between the component of the release device that acts directly on the locking element and the release switch to be actuated by the operator is attained, thereby resulting in additional freedoms in terms of designing the reciprocating saw. A space-saving design is made possible in this case as well, in particular due to the space inside the housing of the fastening device with the switching flange located therein, and with the locking element for fixing the saw blade in position. Due to the distance between the contact point—and/or the line of action or fastening direction of the locking element—between the switching flange and the locking element, and between the switching flange and the plane of motion of the release switch, designs may be realized, e.g., with which the release switch is located on the underside of the fastening housing, adjacent to the saw teeth of the saw blade. In this design, the release switch may be positioned such that it does not extend beyond the side walls of the fastening housing, thereby resulting in a compact device in the transverse direction.

In an advantageous refinement, it is provided that the release switch of the switching device is integrated in the housing of the fastening device in a flush manner, on the outside. This has the advantage that, at least when the release switch is not actuated, it does not extend beyond the outside of the housing wall and therefore is not a hindrance. This is attained, in particular, by designing the release switch as a sliding switch, which is inserted in a groove in the housing and is displaceably guided in this groove.

In a further advantageous refinement, the release switch and switching flange that acts directly on the locking element are designed as one piece. If the release switch is located, e.g., on the underside of the fastening housing, the switching flange extends-over a partial section at least—perpendicularly to the plane of motion of the release switch, to bridge the distance between the release switch and the contact point with the locking element.

In a further preferred embodiment, a separate spring element is provided, which is assigned to the release device and applies force to it in its functional position. The "functional position" is the locked or fixed position, in which the locking element fixes the saw blade in position in a form-fit manner on a component of the reciprocating saw, in particular on the lifting rod. This additional spring element, which acts on the release device, provides an additional measure of security, in order to prevent the saw blade from accidentally coming loose from the fastening device. A total of two spring elements is therefore provided which hold the locking element in the locked position directly or indirectly. The locking element is held in its locked position via the spring force of the remaining, intact spring element, even if one of the spring elements stops functioning.

The second spring element, which is assigned to the release device, is designed, e.g., as a leaf spring. Other spring designs, such as coiled springs, are also possible, however.

In a further, advantageous embodiment, the spring element of the release device and the locking element are located on opposite sides of the saw blade, thereby utilizing the available space inside the fastening housing on the side opposite to the locking element. To this end, a section of the release device—either of the switching flange or the release switch—reaches under the saw blade.

Further advantages and advantageous embodiments are depicted in the further claims, the description of the figures, and the drawing.

DESCRIPTION OF THE PREFERRED EMBODIMENTS

Figure 1:
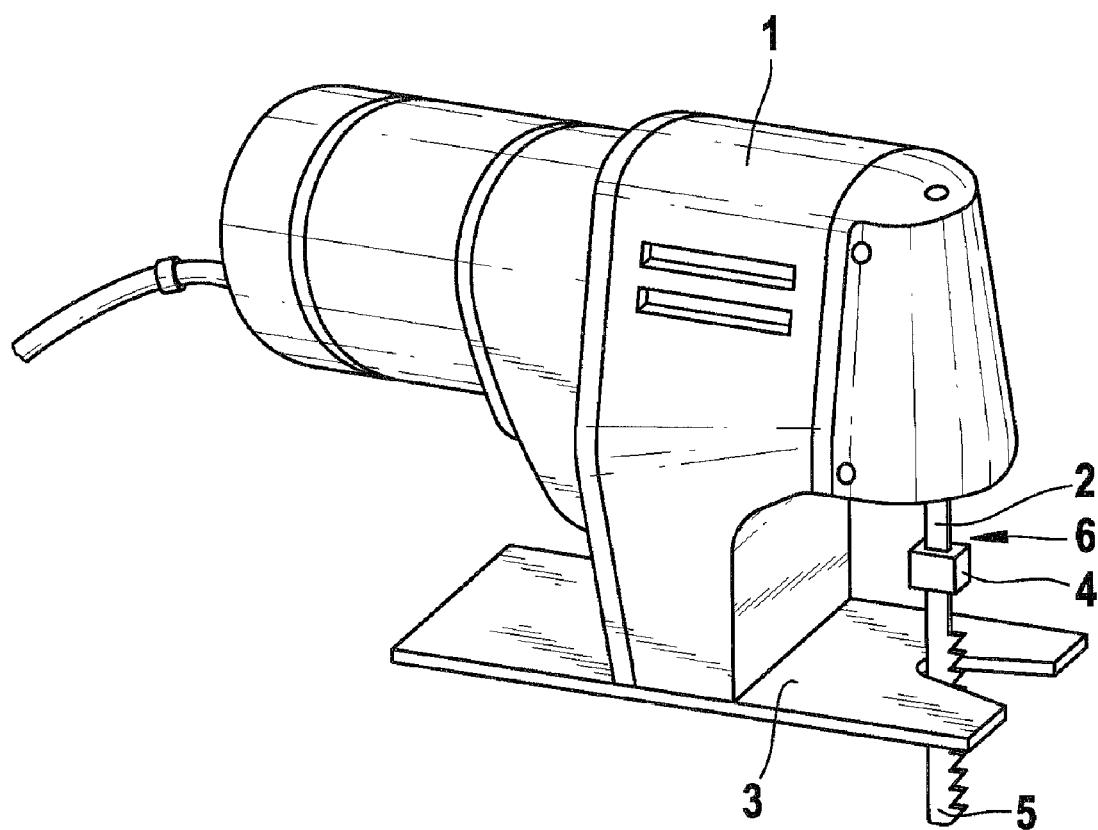
FIG. 1 is a perspective illustration of a jigsaw designed as hand-held power tool.

Components that are the same are labelled with the same reference numerals in the figures.

Electric jigsaw 1 designed as a hand-held power tool and shown in FIG. 1 includes an electric motor-powered lifting rod 2, on which a jigsaw blade 5 is fixed in position at the axis via a fastening device 4. Jigsaw blade 5 is guided in a recess of a guide plate, which is a guide block 3. Lifting rod 2 and jigsaw blade 5 abut each other axially and overlap slightly in the axial direction, and they are detachably interconnected via fastening device 4. To replace saw blade 5, fastening device 4 is released. After the saw blade has been replaced, the fastening device, with the new saw blade, is moved back into the locked position. Lifting rod end 6 extends into the fastening housing of fastening device 4, as does the end face of saw blade 5 facing it.

Figure 2:
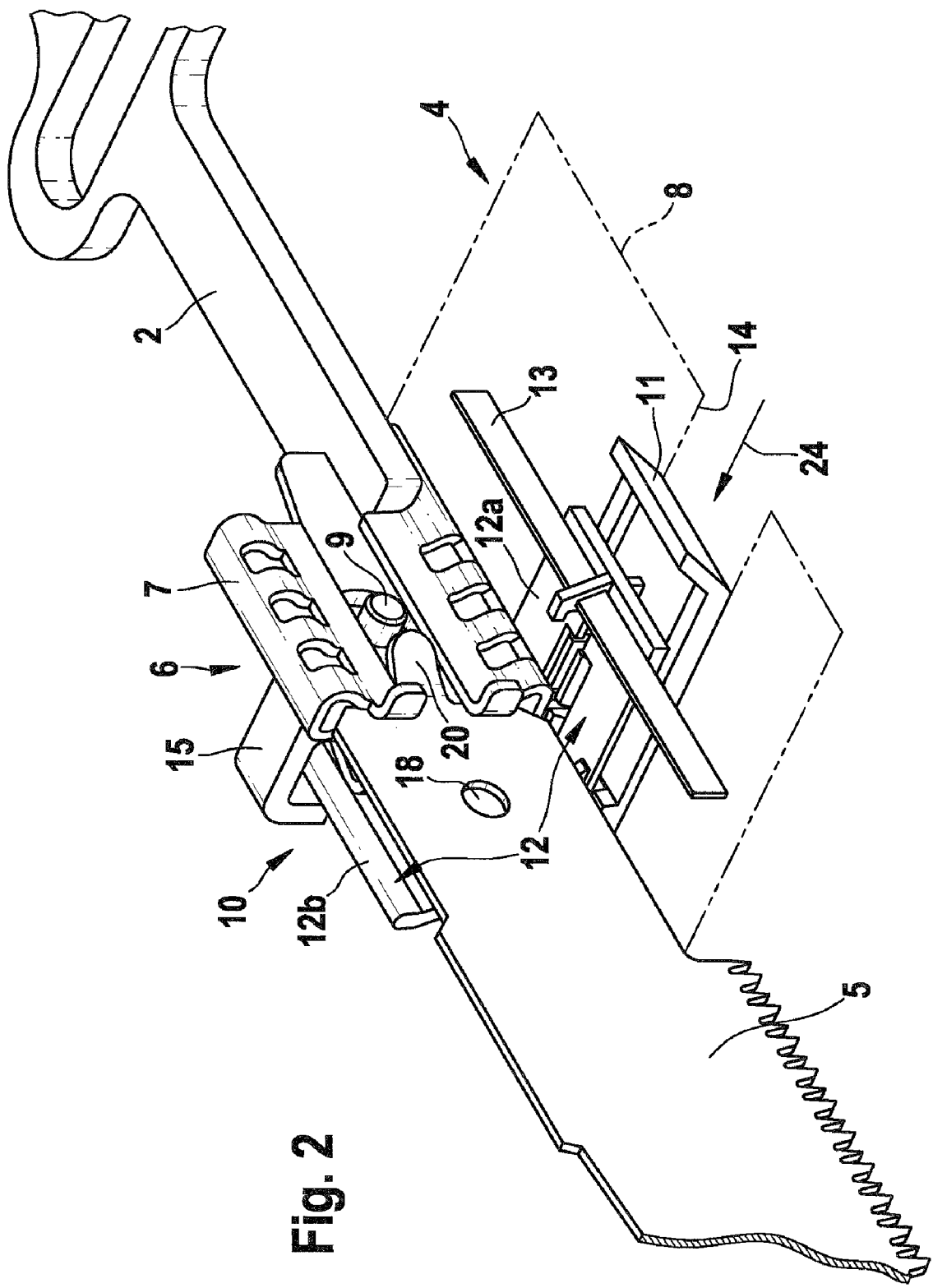
FIG. 2 is a perspective illustration of the inventive fastening device for connecting the motor-operated lifting rod with the jigsaw blade.
Figure 3:
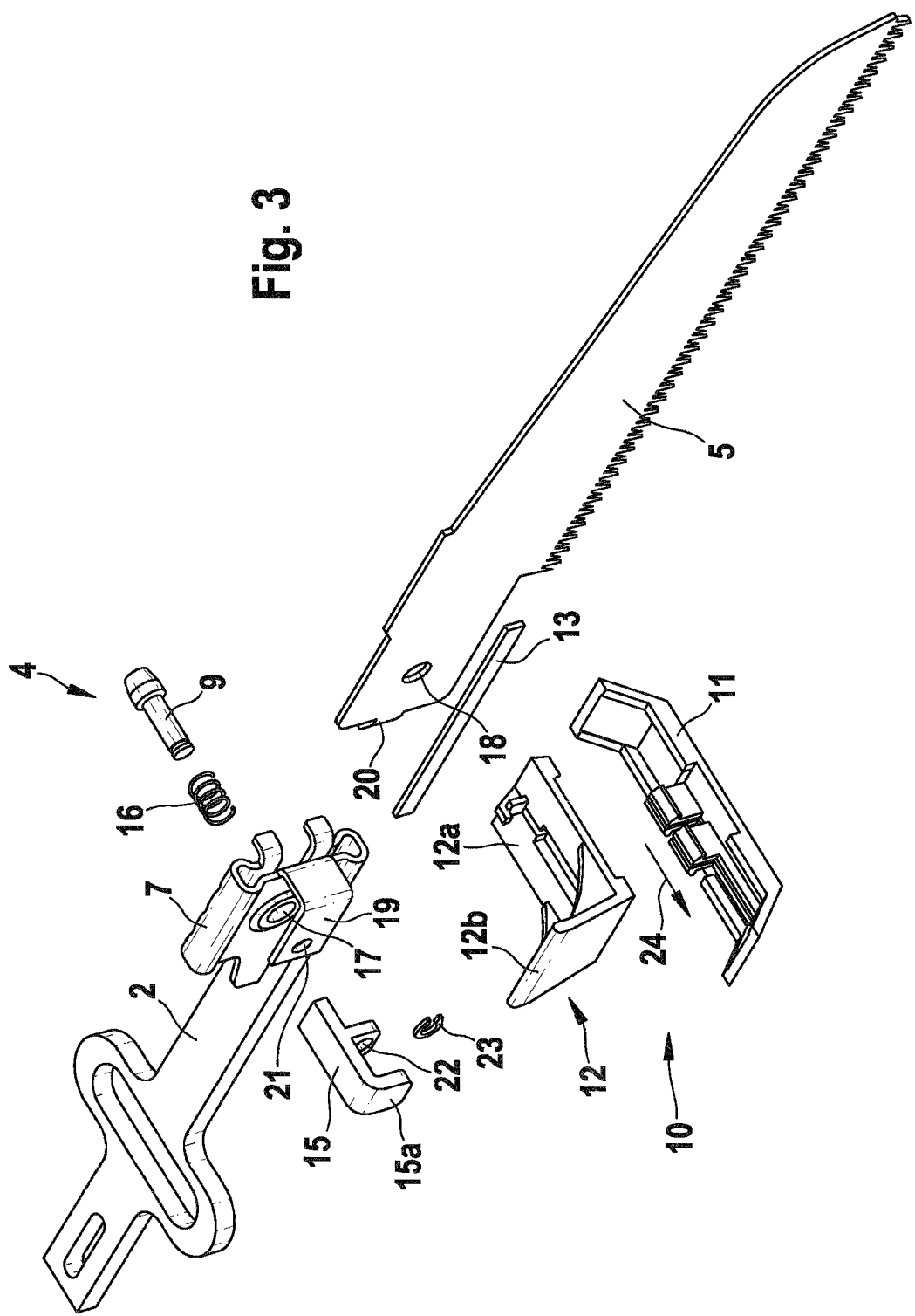
FIG. 3 shows the components of the inventive fastening device, including the lifting rod and the saw blade, in an exploded view.

FIGS. 2 and 3 are detailed illustrations of fastening device 4 for detachably attaching saw blade 5 to lifting rod 2. An insertion part 7 made of metal is attached to lifting rod end 6, being welded thereto in particular. Insertion part 7 is C-shaped and designed in the shape of a clamp, and serves as a receptacle for the axial shank of saw blade 5. The shank of saw blade 5 may be inserted into the receptacle of insertion part 7 so far that an opening 18 in this section of the saw blade aligns with an associated opening 17 (FIG. 3) in insertion part 7. To make it easier to insert saw blade 5 axially into the receptacle in insertion part 7, a starting bevel 20 is formed on the end face of the saw blade. When inserted into the receptacle, starting bevel 20 pushes a spring-loaded locking element 9 out of the fixed and locked position, and into the release position. Locking element 9 extends through both openings 17 and 18 in insertion part 7 and saw blade 5 as soon as these two openings become aligned, thereby securing saw blade 5 axially on lifting rod 2. As shown in FIG. 3, locking element 9 is designed as an axially displaceable locking pin, and it is acted upon with spring force by an adjustment spring 16 and moved into the fixed position. In the fixed position, saw blade 5 is secured on lifting rod 2 in a form-fit manner.

Locking element 9 must be moved out of the fixed position and into the released position in order to release saw blade 5 from the fixed position. To this end, locking element 9 must be slid back axially against the force of adjustment spring 16, an action that is carried out with the aid of a release device 10. Locking element 19 is supported such that it may be displaced transversely to the plane of the saw blade, and it is acted upon with force in the transverse direction.

Release device 10 includes a release switch 11, a switching flange 12, and a connecting part 15. Release switch 11 is located under saw blade 5, on the outside of fastening housing 8, in which all components are housed for fixing the saw blade in position and releasing it. Release switch 11 is supported in a guide groove 14 formed in fastening housing 8 such that it is displaceable in the transverse direction. Switching flange 12 is connected with release switch 11 in a form-fit manner.

Switching flange 12 includes a horizontal section 12a under saw blade 5, lies parallel with release switch 11, and is connected with release switch 11 in a form-fit manner. Switching flange 12 includes a further section 12b, which is perpendicular to section 12a and extends axially parallel to the plane of saw blade 5. Section 12a and release switch 11 are located underneath saw blade 5, while section 12b extends along a side surface of saw blade 5.

A spring element 13 is also assigned to release device 10. Spring element 13 is fixed in position on fastening housing 8, is retained on section 12a of switching flange 12, and applies force on the release device, moving it into its functional position, which is also the position in which locking element 9 is locked in position.

Connecting part 15 connects switching flange 12 of the release device with locking element 9. To this end, connecting element 15 is retained on a fastening flange 19, which is designed as a single piece on insertion part 7. When installed, an end face of locking element 9 extends through a bore 21 formed in fastening flange 19, and through a further recess 22 in connecting part 15. Adjustment spring 16 is designed as a coiled spring and, when installed, is located between fastening flange 19 and the facing side wall of insertion part 7. The end face of locking element 9 extends through openings 17 and 18 in insertion part 7 and/or saw blade 5, through opening 21 in fastening flange 19, and through recess 22 in connecting part 15. A Seeger retaining ring 23 is provided for security; it ensures that the end of locking element 9 that extends through recesses 22 in connecting flange 15 does not accidentally slide out.

Connecting part 15 includes a shoulder 15a that extends downward, toward switching flange 12, and which, when installed, reaches behind associated section 12a of the switching flange. As a result, when release switch 11 and switching flange 12 move in arrow direction 24, connecting element 15 may be displaced in the transverse direction, i.e., in the direction transverse to the plane of saw blade 5, and against the force of adjustment spring 16, and against the force of spring element 13. Since pin-shaped locking element 9 has been secured using Seeger retaining ring 23 on connecting part 15, locking element 9 is also displaced in arrow direction 24, thereby transferring it from the fixed position into the released position, in which locking element 9 is disengaged from openings 17 and 18. In the released position, saw blade 5 may be removed axially from the receptacle in insertion part 7.

As soon as release switch 11 is no longer displaced manually in arrow direction 14, the entire release device returns to its starting position against arrow direction 24 under the action of force of springs 16 and 13 and, in fact, regardless of whether a saw blade 5 has been inserted or not. If a saw blade 5 has hot been inserted, locking element 9 extends only through opening 18 in insertion part 7. As soon as a new saw blade 5 has been slid axially into the receptacle in insertion part 7, starting bevel 20 of this saw blade comes in contact with the end face of the locking element and pushes it back against the spring force so far that the saw blade may be inserted further in the axial direction, until opening 18 in the saw blade aligns with opening 17 in insertion part 7 and locking element 9 may move back into its fixed position.

The advantage of this design is that section 12b of switching flange 12 is located on the same side of the saw blade as locking element 9 and connecting part 15. In the fixed position shown in FIG. 2, the largest part of locking element 9 is located on the side opposite to the observer; only the end face of the locking element extends through the opening in insertion part 7. The remaining components of the release device are located mainly below saw blade 5, as shown in FIG. 2.

These are section 12a and release switch 11, with which section 12a is nearly parallel. Only spring element 13, which applies force to release device 10 and moves it into its functional position, is located on the opposite side.

It is also advantageous that the contact point and/or the line of force and action is located between section 12b of switching flange 12 and locking element 9, the line of force and action coinciding with the axis of locking axis 9 due to connecting part 15 located between them, at a distance from the plane of motion of release switch 11. Release switch 11 is located below saw blade 5. Locking element 9, however, is located nearly in the center of saw blade 5, relative to the height of the saw blade. The height difference between the plane of motion of release switch 11 and the displacement direction of locking element 9 is bridged with the aid of section 12b of the switching flange.

Release switch 11 is displacebly guided in the transverse direction in guide groove 14 in fastening housing 8 and enters the outer wall of the fastening housing—in a flush manner, in particular, so that no sections of release switch 11 extend beyond the outer wall of the fastening housing.

Figure 4:
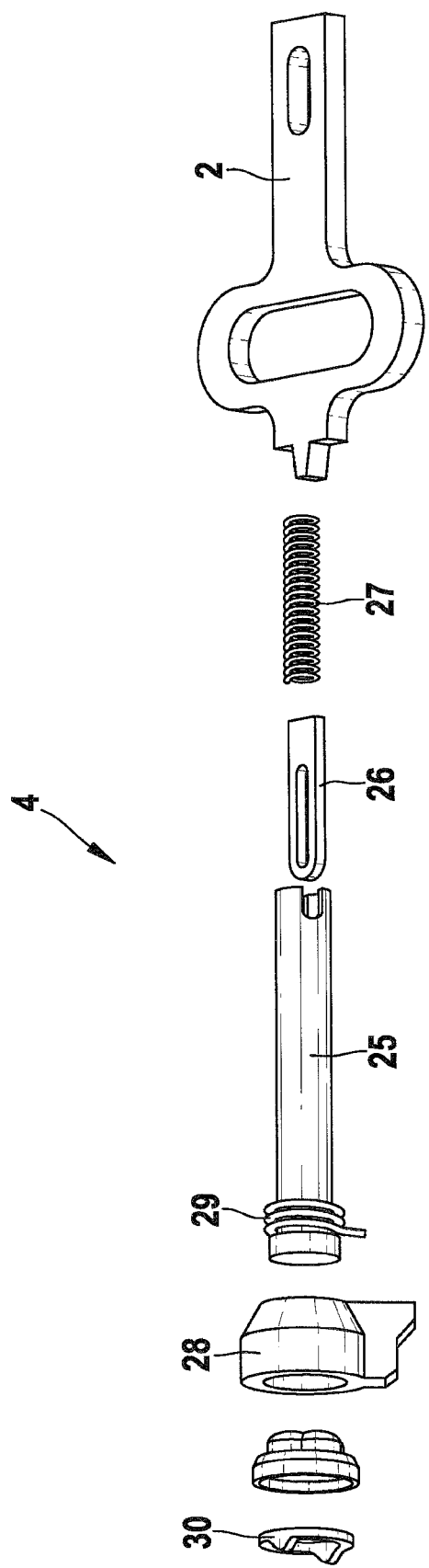
FIG. 4 shows a fastening device in an exploded view, in an alternative embodiment.
Figure 5:
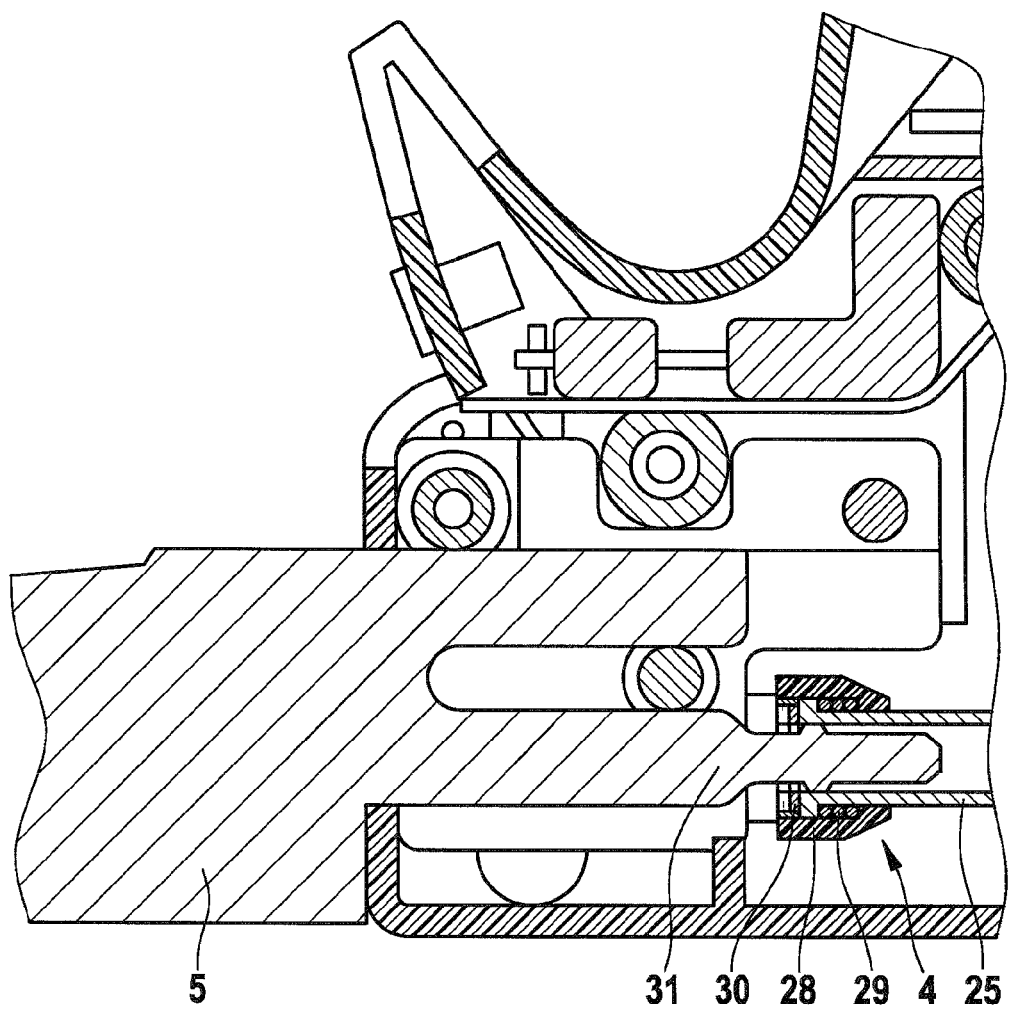
FIG. 5 shows a section of a hand-held power tool with a fastening device according to FIG. 4.

A further exemplary embodiment is shown in FIGS. 4 and 5. Fastening device 4 is composed of a receiving sleeve 25, which is placed axially at one end on an extension of lifting rod 2, and, at the other end, a shank 31 (FIG. 5) is inserted axially into receiving sleeve 25. Shank 31 is inserted axially against the spring force of a spring element 27, which is guided together with a sheet-metal element 26 into the interior of receiving sleeve 25. A rotatable locking element 28 is provided to axially secure jigsaw blade 5, to which force is applied by a torsion spring 29 located on the outer jacket of receiving sleeve 25, thereby moving it into its locked position. Shank 31 of saw blade 5 is secured via a further clamping part 30.

To release the saw blade, locking element 28 must be swiveled back against the force of torsion spring 29, thereby releasing shank 31, so that the saw blade may be removed axially.

What is claimed is:

1. A reciprocating saw with a motor-driven lifting rod (2) that is capable of moving in a reciprocating manner, on the free end (6) of which a fastening device (4) for a saw blade (5) is mounted, the saw blade (5) being non-rotatably held in the fastening device (4), wherein
   a locking element (9), which may be acted upon in the direction of the saw blade (5) by an adjustment spring (16) and which is located between a release position and a fixed position, is provided for axially fixing the saw blade (5) in position in the fastening device (4), the locking element (9) holding the saw blade (5) in the fixed position in a form-fit manner, and wherein a release device (10) is provided, with which the locking element (9) may be displaced into its release position against the spring force of the adjustment spring (16); a component (12) of the release device (10) that acts on the locking element (9) is located on the same side as the locking element (9) relative to the plane of the saw blade (5), and wherein the release device has a release switch (11) designed as a sliding switch and displaceably guided in a guide groove (14) in the housing (8), wherein the release device (10) is acted upon by a separate spring element (13) and moved into its functional position.

2. The reciprocating saw as recited in claim 1, wherein the release switch (11) of the release device (10) is integrated in the housing (8) in a flush manner, on the outside.

3. The reciprocating saw as recited in claim 1, wherein, the release switch (11) and switching flange (12) are interconnected in a form-fit manner.

4. The reciprocating saw as recited in claim 1, wherein the spring element (13) is designed as a leaf spring.

5. The reciprocating saw as recited in claim 1, wherein a clamp-shaped insertion part (7) is attached to the lifting rod (2), which forms a receptacle for the saw blade (5), the locking element (9) being adjustably retained on the insertion part (7).

6. A reciprocating saw with a motor-driven lifting rod (2) that is capable of moving in a reciprocating manner, on the free end (6) of which a fastening device (4) for a saw blade (5) is mounted, the saw blade (5) being non-rotatably held in the fastening device (4),
   wherein
   a locking element (9), which may be acted upon in the direction of the saw blade (5) by an adjustment spring (16) and which is located between a release position and a fixed position, is provided for axially fixing the saw blade (5) in position in the fastening device (4), the locking element (9) holding the saw blade (5) in the fixed position in a form-fit manner, and wherein a release device (10) is provided, with which the locking element (9) may be displaced into its release position against the spring force of the adjustment spring (16); a component (12) of the release device (10) that acts on the locking element (9) is located on the same side as the locking element (9) relative to the plane of the saw blade (5), and wherein the release device has a release switch (11) designed as a sliding switch and displaceably guided in a guide groove (14) in the housing (8), wherein a clamp-shaped insertion part (7) is attached to the lifting rod (2), which forms a receptacle for the saw blade (5), the locking element (9) being adjustably retained on the insertion part (7), wherein a fastening flange (19) is formed on the insertion part (7), against which the adjustment spring (16) bears.

7. The reciprocating saw as recited in claim 6, wherein the locking element (9) is guided on the fastening flange (19).

8. A reciprocating saw with a motor-driven lifting rod (2) that is capable of moving in a reciprocating manner, on the free end (6) of which a fastening device (4) for a saw blade (5) is mounted, the saw blade (5) being non-rotatably held in the fastening device (4), wherein a locking element (9), which may be acted upon in the direction of the saw blade (5) by an adjustment spring (16) and which is located between a release position and a fixed position, is provided for axially fixing the saw blade (5) in position in the fastening device (4), the locking element (9) holding the saw blade (5) in the fixed position in a form-fit manner, and wherein a release device (10) is provided, with which the locking element (9) may be displaced into its release position against the spring force of the adjustment spring (16); a component (12) of the release device (10) that acts on the locking element (9) is located on the same side as the locking element (9) relative to the plane of the saw blade (5), wherein the release device (10) is acted upon by a separate spring element (13) and moved into its functional position; and wherein the spring element (13) and the component (12) of the release device (10) that acts on the locking element (9) are located on opposite sides of the saw blade (5).

9. A reciprocating saw with a motor-driven lifting rod (2) that is capable of moving in a reciprocating manner, on the free end (6) of which a fastening device (4) for a saw blade (5) is mounted, the saw blade (5) being non-rotatably held in the fastening device (4), wherein a locking element (9), which may be acted upon in the direction of the saw blade (5) by an adjustment spring (16) and which is located between a release position and a fixed position, is provided for axially fixing the saw blade (5) in position in the fastening device (4), the locking element (9) holding the saw blade (5) in the fixed position in a form-fit manner, and wherein a release device (10) is provided, with which the locking element (9) may be displaced into its release position against the spring force of the adjustment spring (16); a release switch (11) of the release device (10) is located on the outside of the housing (8) of the fastening device (4), the release device (10) including a switching flange (12) in the housing (8), which is connected with the release switch (11); the switching flange (12) acts on the locking element (9), and the contact point is located between the switching flange (12) and locking element (9) at a distance from the plane of motion of the release switch (11), wherein the release device (10) is acted upon by a separate spring element (13) and moved into its functional position; and wherein the spring element (13) and a component (12b) of the release device (10) that acts on the locking element (9) are located on opposite sides of the saw blade (5).

\* \* \* \* \*